Figure 1:
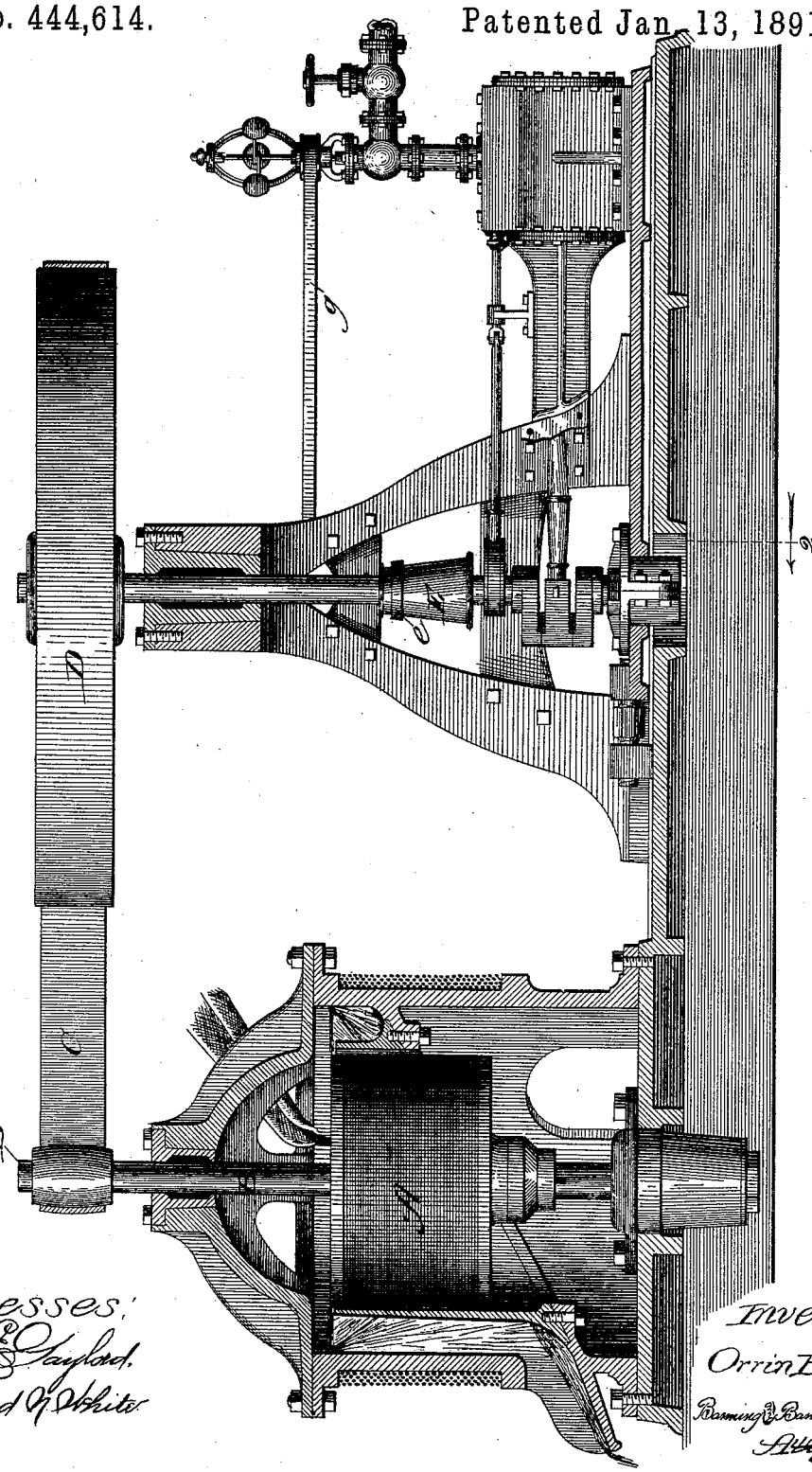

(No Model.) 2 Sheets—Sheet 1.

O. B. PECK.
PROCESS OF CENTRIFUGALLY TREATING PARTICLES OF METALLIC OR MINERAL BEARING SUBSTANCES.

No. 444,614. Patented Jan. 13, 1891.

Witnesses:
Inventor:
Orrin B. Peck.

(No Model.) 2 Sheets—Sheet 2.
O. B. PECK.
PROCESS OF CENTRIFUGALLY TREATING PARTICLES OF METALLIC OR MINERAL BEARING SUBSTANCES.
No. 444,614. Patented Jan. 13, 1891.
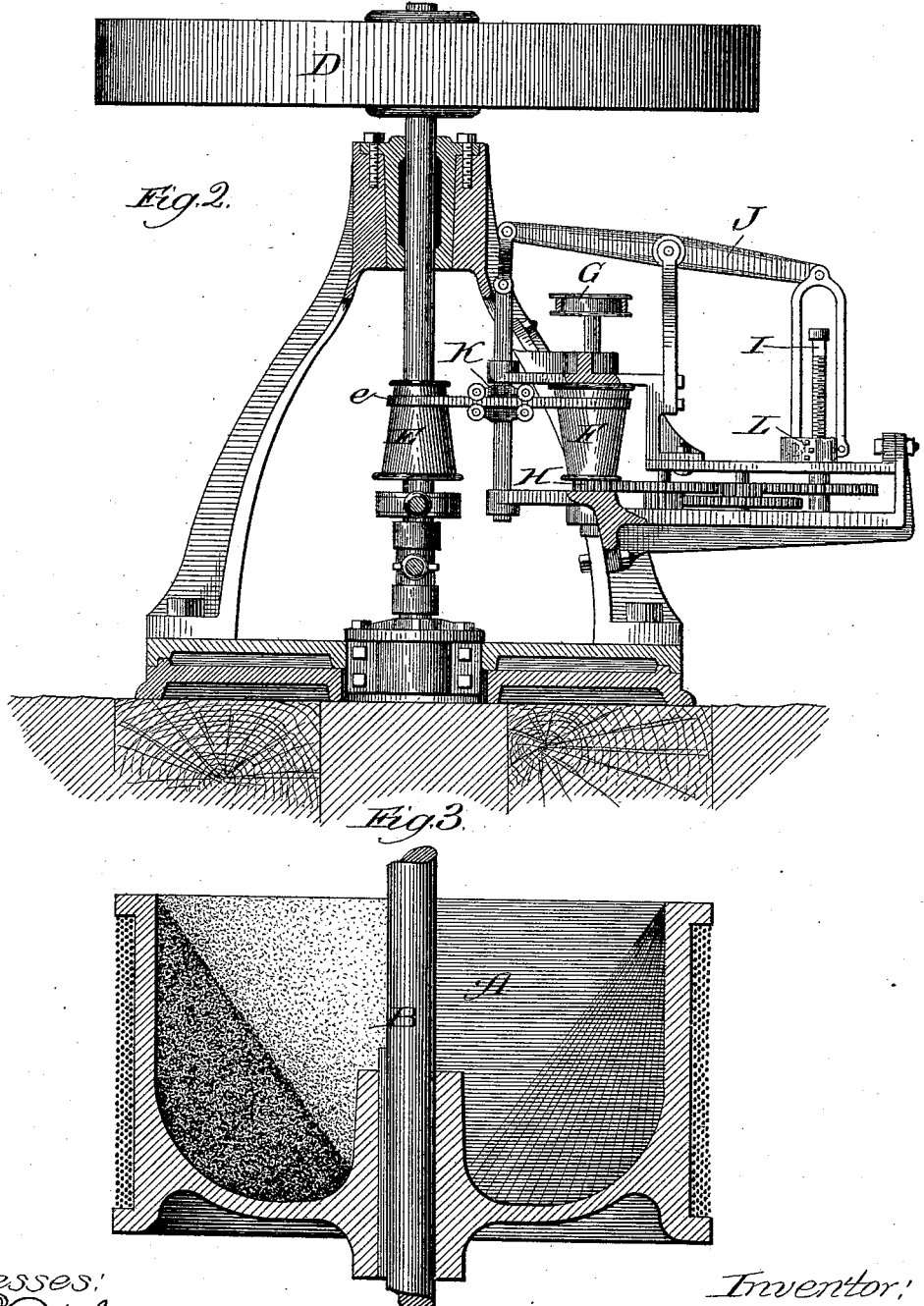
Witnesses:
Inventor:
Orrin B. Peck,
By Banning & Banning & Payson,
Att'ys

UNITED STATES PATENT OFFICE.

ORRIN B. PECK, OF CHICAGO, ILLINOIS, ASSIGNOR TO MELINDA PECK, OF SAME PLACE.

PROCESS OF CENTRIFUGALLY TREATING PARTICLES OF METALLIC OR MINERAL-BEARING SUBSTANCES.

SPECIFICATION forming part of Letters Patent No. 444,614, dated January 13, 1891.

Application filed May 23, 1890. Serial No. 352,907. (No specimens.)

*To all whom it may concern:*

Be it known that I, ORRIN B. PECK, a citizen of the United States, residing at Chicago, Illinois, have invented a certain new and useful Process of Centrifugally Treating Particles of Metallic or Mineral-Bearing Substances of Different Degrees of Specific Gravity, of which the following is a specification.

The object of my invention is the process of treating and separating metallic or mineral-bearing substances of different degrees of specific gravity when in a fine or powdered condition by subjecting them to the action of gradually-decreasing centrifugal force in a revoluble vessel which is rotated at a high degree of speed at the commencement of the operation and at a gradually-decreasing speed to the end of the operation; and my improved process consists in the mode of so treating fine or powdery material and of operating a machine or vessel to accomplish such treatment, as hereinafter described and claimed.

In the drawings, Figure 1 represents a side elevation, partly in section, of mechanical means which may be employed in carrying out and applying my new process or method of treating fine or powdered materials containing particles of different degrees of specific gravity. Fig. 2 is a vertical section taken on the line 2 of Fig. 1, looking in the direction of the arrow; and Fig. 3 is a vertical section of the revoluble vessel in which the material is treated.

I have found in the treatment of fine or powdered substances in an open revoluble vessel to subject them to the action of centrifugal force that the quantity of the matter which remains in the revoluble vessel is governed by the amount of centrifugal force developed, which in turn is governed by the rate of speed, at which the vessel is rotated. If the revoluble vessel be rotated at a high rate of speed the material treated will be thrown by the action of centrifugal force up around the sides of the vessel into a position more nearly approaching a vertical line than when the vessel is run at a reduced speed. The lines shown in Fig. 3 diverging from the top of the vessel to the bottom on one side will serve to illustrate the position and quantity of material in the revoluble vessel at different degrees of speed. I have also learned that the heavier particles are more difficult to discharge than the lighter ones, under the same conditions requiring a greater centrifugal force, and hence a higher speed of the vessel. In order, therefore, to avail myself of the advantages of the facts above explained, I have conceived the idea of subjecting the matter treated to the action of centrifugal force in a vessel run at a constantly-decreasing rate of speed. In other words, I have conceived the idea of running the vessel at a high rate of speed when I begin to introduce the matter to be treated and to constantly and gradually decrease its speed until the end of the operation, which will be when the vessel has become sufficiently filled for emptying. In this way a portion of the matter treated is permitted to gradually and constantly accumulate on the surface of that already retained in the vessel, thereby gradually increasing the quantity retained or accumulated as the speed, and consequently the centrifugal force developed, is diminished, and as the heavier particles are more easily and readily retained in the vessel than the lighter particles they constantly lodge on the surface of the accumulating mass in the vessel and form by far the larger portion of the material caught and retained as the speed of the vessel decreases.

In arranging mechanical means for carrying out or applying my processes I mount an open and suitable revoluble vessel A on a rotatable shaft B, arranged and supported in any proper and suitable bearings, so that it may be rotated and with it rotate the revoluble vessel at a high rate of speed. This shaft may be driven by a belt C, arranged on a pulley D, adapted to be driven by the engine in any convenient way. The shaft on which this pulley is mounted, and which I will term a "power-shaft," although, as shown in the drawings, it is an extension of the crank-shaft of the engine, is provided with a taper pulley or sleeve E, which of course rotates with it. A belt *e* runs over this pulley to another taper pulley F on a shaft for driving the governor of the engine. The taper pulleys E and F are inclined in opposite directions. The shaft for driving the governor of the engine is provided with a pulley G, which connects by the belt $g$ with the governor of the engine, as shown in Fig. 1. The shaft carrying the pulley G also carries a pinion-wheel H at its lower end, which engages or meshes with the series of gear-wheels shown in Fig. 2, so that as it rotates the train of gear-wheels will also be rotated. Through means of these gear-wheels a threaded rod I is rotated. The arrangement of the gear-wheels is intended to be such that the rod I will rotate at a very slow rate of speed. A lever J is fulcrumed in any convenient position so as to carry at one end a belt-guide K and at the other a nut L, engaging with the screw-threaded rod I. Of course it will be understood that the belt-guide and the nut are connected to the lever J by a proper link or connection capable of moving them up and down in a vertical plane as the ends of the lever are raised or lowered. The belt-guide K engages with the belt $e$, so as to carry it up and down, as it may be moved in one direction or the other. When it is intended to treat material in the revoluble vessel, it is started while empty at a high rate of speed through the power of the engine rotating the pulley D and driving the belt C. The requisite speed of the revolving vessel can be secured in a very short time, and the material to be treated in a fine or powdery condition introduced or poured into it, preferably in a small or appropriate stream, and preferably mixed with water, as shown in Fig. 1. As the shaft on which the pulley D is mounted is rotated, the taper pulley E will also be rotated, and also the pulley F, through the connection of the belt $e$. At the commencement of the operation the belt $e$ is at its highest position, or on the smallest part of the pulley E and the largest part of the pulley F, and with the pulley F the pulley G, that connects by belting with the governor of the engine, will be rotated at a low rate of speed as compared with the speed of rotation of the pulley E and of the revoluble vessel. As the pulley F and its shaft rotate, however, they will rotate the threaded rod I through the connection of the gear-wheels. This will gradually cause the nut L to rise and the belt-guide K to descend. As this takes place the belt E will constantly be moved toward the smaller end of the pulley F. This will increase the speed of rotation of such pulley and the pulley connecting with the governor of the engine. As the speed of the governor is thus increased it will gradually shut off or diminish the supply of steam from the engine to the cylinder, so that the shaft B and the revoluble vessel will rotate at a diminishing rate of speed. This constant diminishing of the rate of speed of the revoluble vessel will continue until the end of the operation, which is intended to be timed so that the vessel will be filled as much as intended with the heavier particles of the matter treated. This may require an hour, or more or less, according to its size and the amount of material which it is deemed advisable to retain in the vessel; but the intention is that the rotation of the vessel shall commence at a high rate of speed and gradually diminish until the operation is completed. The means described above will effect this end, although it is obvious that other means can be employed for reducing the speed of the revolving vessel from a high to a diminished speed of rotation, and I do not therefore desire to confine myself to the specific means described, nor do I desire in this case to claim the mechanical features shown and described, as I propose to make them the subject of another application.

What I regard as new, and desire to secure by Letters Patent, is—

The process of treating and separating particles of metallic or mineral-bearing substances of different degrees of specific gravity, which consists in subjecting them as introduced to the action of centrifugal force in a revoluble vessel rotating at a high degree of speed at the commencement of the operation and afterward at a diminishing speed, substantially as described.

ORRIN B. PECK.

Witnesses:
 GEORGE S. PAYSON,
 THOS. A. BANNING.